US012718468B2

(12) United States Patent
Steinbach et al.

(10) Patent No.: US 12,718,468 B2
(45) **Date of Patent: *Aug. 25, 2026**

(54) VISUAL LOCALIZATION

(71) Applicant: NAVVIS GmbH, Munich (DE)

(72) Inventors: Eckehard Steinbach, Olching (DE); Robert Huitl, Baldham (DE); Georg Schroth, Munich (DE); Sebastian Hilsenbeck, Munich (DE)

(73) Assignee: NavVis GmbH, Munich (DE)

( * ) Notice: Subject to any disclaimer, the term of this patent is extended or adjusted under 35 U.S.C. 154(b) by 105 days.

This patent is subject to a terminal disclaimer.

(21) Appl. No.: 18/424,286

(22) Filed: Jan. 26, 2024

(65) Prior Publication Data

US 2024/0169660 A1 May 23, 2024

Related U.S. Application Data

(63) Continuation of application No. 17/383,613, filed on Jul. 23, 2021, now Pat. No. 11,887,247, which is a (Continued)

(30) Foreign Application Priority Data

Sep. 21, 2012 (EP) .................................... 12006628

(51) Int. Cl.
*G06T 15/20* (2011.01)
*G01C 21/20* (2006.01)
(Continued)

(52) U.S. Cl.
CPC .......... *G06T 15/205* (2013.01); *G01C 21/206* (2013.01); *G06F 16/3328* (2019.01); *G06F 16/50* (2019.01); *G06F 16/53* (2019.01); *G06F 16/56* (2019.01); *G06F 18/22* (2023.01); *G06T 3/00* (2013.01); *G06T 3/18* (2024.01); *G06T 7/50* (2017.01); *G06T 7/74* (2017.01);
(Continued)

(58) Field of Classification Search
CPC ... G01C 21/206; G06F 16/3328; G06F 16/50; G06F 16/56; G06F 18/22; G06F 16/53; G06T 15/06; G06T 15/20; G06T 15/205; G06T 17/00; G06T 19/006; G06T 2207/30244; G06T 3/00; G06T 3/18; G06T 7/50; G06T 7/74; G06T 7/75; G06V 20/10
See application file for complete search history.

(56) References Cited

U.S. PATENT DOCUMENTS 6,333,749 B1 12/2001 Reinhardt et al.
6,512,857 B1 1/2003 Hsu et al.
(Continued)

OTHER PUBLICATIONS

Andreas Wendel, Arnold Irschara and Horst Bischof, "Natural landmark-based monocular localization for MAVs", Robotics and Automation (ICRA), 2011 IEEE International Conference on, 2011, pp. 5792-5799.

(Continued)

*Primary Examiner* — George Eng
(74) *Attorney, Agent, or Firm* — Budzyn IP Law, LLC

(57) ABSTRACT

In an embodiment of the invention there is provided a method of visual localization, comprising: generating a plurality of virtual views, wherein each of the virtual views is associated with a location; obtaining a query image; determining the location where the query image was obtained on the basis of a comparison of the query image with said virtual views.

4 Claims, 7 Drawing Sheets

Related U.S. Application Data continuation of application No. 16/388,988, filed on Apr. 19, 2019, now Pat. No. 11,094,123, which is a continuation of application No. 14/430,327, filed as application No. PCT/EP2013/069750 on Sep. 23, 2013, now Pat. No. 10,319,146.

(51) Int. Cl.

| | |
|---|---|
| ***G06F 16/332*** | (2025.01) |
| ***G06F 16/50*** | (2019.01) |
| ***G06F 16/53*** | (2019.01) |
| ***G06F 16/56*** | (2019.01) |
| ***G06F 18/22*** | (2023.01) |
| ***G06T 3/00*** | (2024.01) |
| ***G06T 3/18*** | (2024.01) |
| ***G06T 7/50*** | (2017.01) |
| ***G06T 7/73*** | (2017.01) |
| ***G06T 15/06*** | (2011.01) |
| ***G06T 19/00*** | (2011.01) |
| ***G06V 20/10*** | (2022.01) |

(52) U.S. Cl.

CPC ................ *G06T 7/75* (2017.01); *G06T 15/06* (2013.01); *G06T 15/20* (2013.01); *G06T 19/006* (2013.01); *G06V 20/10* (2022.01); *G06T 2207/30244* (2013.01)

(56) References Cited

U.S. PATENT DOCUMENTS

| | | | |
|---|---|---|---|
| 2003/0225513 | A1 | 12/2003 | Gagvani et al. |
| 2005/0190972 | A1 | 9/2005 | Thomas et al. |
| 2007/0013710 | A1 | 1/2007 | Higgins et al. |
| 2008/0027591 | A1 | 1/2008 | Lenser et al. |
| 2008/0226130 | A1 | 9/2008 | Kansal et al. |
| 2013/0101175 | A1 | 4/2013 | Lynch |
| 2013/0121600 | A1 | 5/2013 | Lin et al. |
| 2015/0139608 | A1 | 5/2015 | Theobalt et al. |
| 2015/0294189 | A1 | 10/2015 | Benhimane et al. |

OTHER PUBLICATIONS

Dave Shreiner, Mason Woo, Jackie Neider and Tom Davis, “OpenGL Programing Guide Sixth Edition”, Addison-Wesley, First printing, Jul. 2007, Glossary—p. 815-836.

Hynek Bakstein and Ales Leonardis, “Catadioptic Image-based Rendering for Mobile Robot Localization”, 2007 IEEE 11th International Conference on Computer Vision, Year: 2007, pp. 1-6.

Iryna Gordon and David G. Lowe, “What and Where: 3D Object Recognition with Accurate Pose”, Toward Category-Level Object Recognition, LNCS 4170, 2006 Springer-Verlag Berlin Heidelberg, pp. 67-82.

Samuel W. Hasinoff, Martyna Jozwiak, Fredo Durand and William T. Freeman, “Search-and-Replace Editing for Personal Photo Collections”, 2010 IEEE International Conference on Computational Photography (ICCP), Sep. 23, 2010.

VISUAL LOCALIZATION

This application is a continuation of U.S. application Ser. No. 17/383,613, filed Jul. 23, 2021, now U.S. Pat. No. 11,887,247, which is a continuation of U.S. application Ser. No. 16/388,988, filed Apr. 19, 2019, now U.S. Pat. No. 11,094,123, which is a continuation of U.S. application Ser. No. 14/430,327, filed Mar. 23, 2015, now U.S. Pat. No. 10,319,146, which is a National Stage Application under 35 U.S.C. § 371 of PCT Application No. PCT/EP2013/069750, filed, Sep. 23, 2013, the disclosures of which are incorporated by reference herein.

BACKGROUND

Contemporary smart phones use various localization methods based on GPS, cellular networks and Wifi networks. However, none of the methods available today is able to reliably and accurately determine a user's location inside buildings.

Normally, no infrastructure supporting localization is available inside buildings. Similarly, smartphones may not be equipped with specialized localization hardware.

With recent advances in content based image retrieval (CBIR), fast visual localization of mobile devices becomes feasible. Accordingly, the visual information that may be made available through a phone's camera is used for location estimation. By comparing the features visible in the image taken by the camera to geo-tagged reference images recorded previously during a mapping run, the location of the camera can be determined.

Utilizing video recordings of a mobile device as a visual fingerprint of the environment and matching them to a geo-referenced database provides pose information in a very natural way. Hence, location based services (LBS) can be provided without complex infrastructure in areas where the accuracy and availability of GPS is limited. This is particularly interesting for indoor environments, where traditional localization methods like GPS are unavailable.

However, the application of CBIR to mobile location recognition implies several challenges. The complex 3D shape of the environment results in occlusions, overlaps, shadows, reflections, etc., which require a robust description of the scene. Bag-of-Features based image representations are able to fulfill these requirements, however they require a huge amount of reference images in order to be useful for localization.

Vision-based localization systems make use of local image features, organized in a searchable index using content-based image retrieval (CBIR) methods. Once trained on a set of reference images, CBIR systems are able to rapidly identify images similar in appearance to a query image. However, when applied to the problem of visual localization, two major problems surface:

Limited accuracy: In order to provide reference images for the image retrieval system, the environment needs to be mapped, i.e. images have to be captured at various locations and orientations, and corresponding map coordinates have to be stored. This is commonly achieved by mapping trolleys which automatically capture images and acquire a 3D point cloud model as it is moved through the environment. Although automated to a large degree, mapping buildings on a large scale is a time-consuming and tedious endeavor, and it is impossible to capture images at every combination of location and orientation that might occur during localization. in practice, images are captured along a single trajectory only, drastically limiting the resolution of position and orientation estimates as returned by the image retrieval process.

Perspective distortion: The 1 united affine and perspective invariance of feature descriptors is a severe problem, as a location can be recognized only if a reference image with a pose similar enough to the query image exists. There has been extensive work on improving the robustness of feature descriptors under perspective distortion. However, robustness is gained at the expense of distinctiveness, hence such approaches tend to increase recall only, but not precision.

It is known to apply content based image retrieval approaches for location recognition in textured outdoor environments [1, 2, 10, 11]. Indoor environments, however, are more challenging, as only few distinctive features are available and perspective distortion is more pronounced, especially in narrow corridors.

Attempts to address perspective distortions are described in [3] and [7]. However, these methods are computationally expensive or do not have to deal with complex geometric variations.

Further, it is known to determine information on the 3D structure of an environment, e.g. via laser scans, and to use such information to generate locally orthogonal projections. In [2] there is described a combination of conventional, perspective images with orthogonal projections of building facades to increase invariance with respect to the viewpoint. Increasing feature invariance however, generally deteriorates distinctiveness, which is particularly unfavorable in texture-poor indoor environments.

From [13] it is known to generate viewpoint invariant patches (VIP) to improve robustness in respect of 3D camera motion.

The generation of synthetic views is described in [5]. However, the approach described in this document may be insufficient in case of sparse reference imagery. Further, occlusions are not handled by this approach, which is of particular importance in indoor environments where obstacles and walls restrict visibility.

From [1] it is known to generate orthogonal projections of buildings facades. Query images are normalized to surface-parallel views after analyzing them for vanishing points. However, this approach too is expensive in terms of processing.

LIST OF REFERENCES

[1] G. Baatz, K. Kuser, D. Chen, R. Grzeszczuk, and M. Pollefeys. Leveraging 3D city models for rotation invariant place-of-interest recognition.
International Journal of Computer Vision, 96(3):315-334, Febuary 2012.

[2] D. Chen, G. Baatz, K. User, S. Tsai, R. Vedantham, T. Pylvanainen, K. Roimela, X. Chen, J. Bach, M. Pollefeys, B. Girod, and R. Grzeszczuk. City-scale landmark identification on mobile devices.
In CVPR, pages 737-744, Colorado Springs, USA, June 2011.

[3] D. Chen, S. S. Tsai, V. Chandrasekhar, G. Takacs, J. Singh, and B. Girod.
Robust image retrieval using multiview scalable vocabulary trees.
In Proc. of SPIE, number 1, pages 72570V-9, San Jose, USA, January 2009.

[4] R. Huitl, G. Schroth, S. Hilsenbeck, F. Schweiger, and E. Steinbach. TUMindoor: An extensive image and point cloud dataset for visual indoor localization and mapping.
In IEEE International Conference on Image Processing, Miami, USA, September 2012.

[5] A. Irschara, C. Zach, J.-M. Frahm, and H. Bischof. From structure-from-motion point clouds to fast location recognition.
In CVPR, pages 2599-2606, Miami, USA, June 2009.

[6] T. Liu. M. Carlberg, G. Chen, J. Chen, J. Kua, and A. Zakhor.
Indoor localization and visualization using a human-operated backpack system.
In Indoor Positioning and Indoor Navigation (IPIN), pages 1-10 Sep. 2010.

[7] J.-M. More1 and a Yu.
Asift: A new framework for fully affine invariant image comparison.
SIAM Journal on Imaging Sciences, 2(2):438-469, April 2009.

[8] D. Nister and H. Stewenius.
Scalable recognition with a vocabulary tree.
In CVPR, pages 2161-2168, New York, USA, June 2006.

[9] R. B. Rusu and S. Cousins.
3D is here: Point Cloud Library (PCL).
In IEEE International Conference on Robotics and Automation (ICRA), Shanghai, China, May 9-13, 2011.

[10] G. Schroth, R. Huitl, M. Abu-Alqumsan, F. Schweiger, and F. Steinbach.
Exploiting prior knowledge in mobile visual location recognition.
In IEEE ICASSP, Kyoto, Japan, March 2012.

[11] G. Schroth, R. Huitl. D. Chen, M. Abu-Alqumsan, A. Al-Nuaimi, and E. Steinbach.
Mobile visual location recognition.
IEEE Signal Processing Magazine, 28(4):77-89, July 2011.

[12] J. Sivic and A. Zisserman.
Video Google: A text retrieval approach to object matching in videos.
In International Conference on Computer Vision, volume 2, pages 1470-1477, Beijing, October 2003.

[13] C. Wu. B. Clipp, X. Li, J.-M. Frahm, and M. Pollefeys.
3D model matching with viewpoint-invariant patches (VIP).
In CVPR, Anchorage, USA, June 2008.

The present invention aims to address the above problems. In particular, but not exclusively, the present invention aims to provide a robust method of visual localisation that is suitable for indoor environments. Moreover, the present invention aims to provide a method of visual localisation that can provide satisfactory results on the basis of a relatively low number of reference images.

SUMMARY OF THE INVENTION

According to an aspect of the present invention, there is provided a method of visual localisation, comprising: generating a plurality of virtual views, wherein each of the virtual views is associated with a location; obtaining a query image; determining the location where the query image was obtained on the basis of a comparison of the query image with said virtual views.

In particular, in an embodiment of the invention there is provided a method for visual localization based on pre-computed virtual images or image patches at arbitrary, user-defined locations from sparse reference imagery. The method relies on knowledge about planar regions present in the scene, and projectively transforms reference images to the virtual view's location. Instead of using planar models, more sophisticated three-dimensional models of the environment can be constructed in order to generate virtual views for localisation.

Query images are matched to virtual views using suitable image retrieval techniques. In exemplary implementations, the invention provides a localisation system that is able to robustly determine the orientation and position on a meter-level within fractions of a second.

Further, in an embodiment there is provided a method for locating images depicting the parts of a plane that are visible in a virtual view. There is also provided a localisation system based on this approach that is able to determine the position and orientation of images at locations where no reference images have been captured.

The present invention is able to use sparsely distributed reference images to perform a reliable visual localisation. In an embodiment, local image features are extracted from virtual viewpoints by identifying planar regions in the virtual images and applying corresponding homography transformations to reference images. By extracting local features from the generated image patches, and combining features from all patches for a viewpoint into a document that is indexed by the CBIR system, the present invention enables determining camera poses far off the mapper trajectory solely based on image retrieval results.

The present invention which is based on visual information is particularly suited for indoor localization.

In particular, the present invention provides a method of visually localising a mobile device (or in more generic terms, any image) by determining the visual similarity between the image recorded at the position to be determined and localized (virtual) reference images stored in a database.

In a preferred embodiment of the present invention, the localized (real) reference images, which have been recorded along a mapping trajectory, are transformed into virtual viewpoints of arbitrary camera positions and orientations in the environment. The viewpoints arc represented by their respective bag-of-features vectors and image retrieval techniques are applied to determine the most likely pose of query images. This can be performed at relatively low computational complexity. As virtual image locations and orientations are decoupled from actual image locations, the system is able to work with sparse reference imagery and copes well with perspective distortion. Experiments have confirmed that pose retrieval performance is significantly increased compared to conventional systems relying on (real) reference images only.

The method according the present invention may be used in connection with a reference database of virtual views that stores the appearance at distinct locations and orientations in an environment, and an image retrieval engine that allows lookups in this database by using images as a query.

The generation of the reference database is an offline process performed after an environment has been mapped. During the mapping phase, may be captured and tagged with their 6-DOF pose (location and orientation) and, in addition, a three-dimensional point cloud model may be acquired. A two-dimensional occupancy grid map may be used as a reference coordinate system and to determine valid locations for virtual views.

The present invention resides in particular in using pre-computed virtual views of the environment, generated from relatively few reference images, for visual localization in a content-based image retrieval (CBIR) scheme. In the following, exemplary embodiments of the invention are described. These embodiments rely on a detection of planes in the scene/environment and are applicable even in situations where no accurate 3D model is available.

In an embodiment of the invention, the method comprises determining a plurality of points in an environment, estimating a normal vector of each of the plurality of points, and determining a planar surface element or a polygon for each of the plurality of points based on the respective normal vector. If polygons are determined, the method may comprises determining a polygon mesh comprising the polygons.

For some or all of the points or the surface elements or the polygons, one or more reference images that include the points or surface elements or polygons, respectively, can be determined.

In addition, for each reference image, a first depth map can be created on the basis of the points that have been mapped to planar surface elements.

Moreover, the aforementioned virtual views may be generated from one or more of reference images, and for each virtual view, a second depth map may be generated.

In one embodiment, a selected reference image is warped to a given virtual viewpoint based on the first and/or second depth map, thereby to generate a virtual view from the viewpoint.

The method may further comprise comparing a predicted depth with a corresponding depth stored in the first and/or second depth map, thereby to detect occlusions or obstructions.

Additional advantageous features are recited in the subordinate claims and explained in the following description of exemplary embodiments.

BRIEF DESCRIPTION OF THE DRAWINGS

FIG. 3 (*b*) illustrates how images are assigned an warped to each plane.

FIG. 3 (*c*) illustrates how the mask keeps track of unassigned plane parts.

DESCRIPTION OF EXEMPLARY EMBODIMENTS OF THE INVENTION

Plane Segmentation

As described above, the present invention enables the rendering of (partial) images from arbitrary viewpoints in a 3D scene or environment. In an embodiment of the present invention, in order to simplify the mapping phase and the rendering of novel views, triangulation of points to meshes is avoided, and instead predetermined geometric models, such as planes, are used to represent portions/regions of the environment, e.g. building interiors. As projections of a plane into the image space of two cameras are related by a homography (projective transform), viewpoint changes from one camera towards the other can be simulated by applying the projective transform to the former camera's image. In this embodiment, a reference view is chosen as the former camera and its image is transformed to the virtual camera's view by applying the projective transform, which is a function of pose and calibration of the two cameras (reference view and virtual view) and the plane's position in space. This simplifies the computation of new views from existing images.

Figure 2:
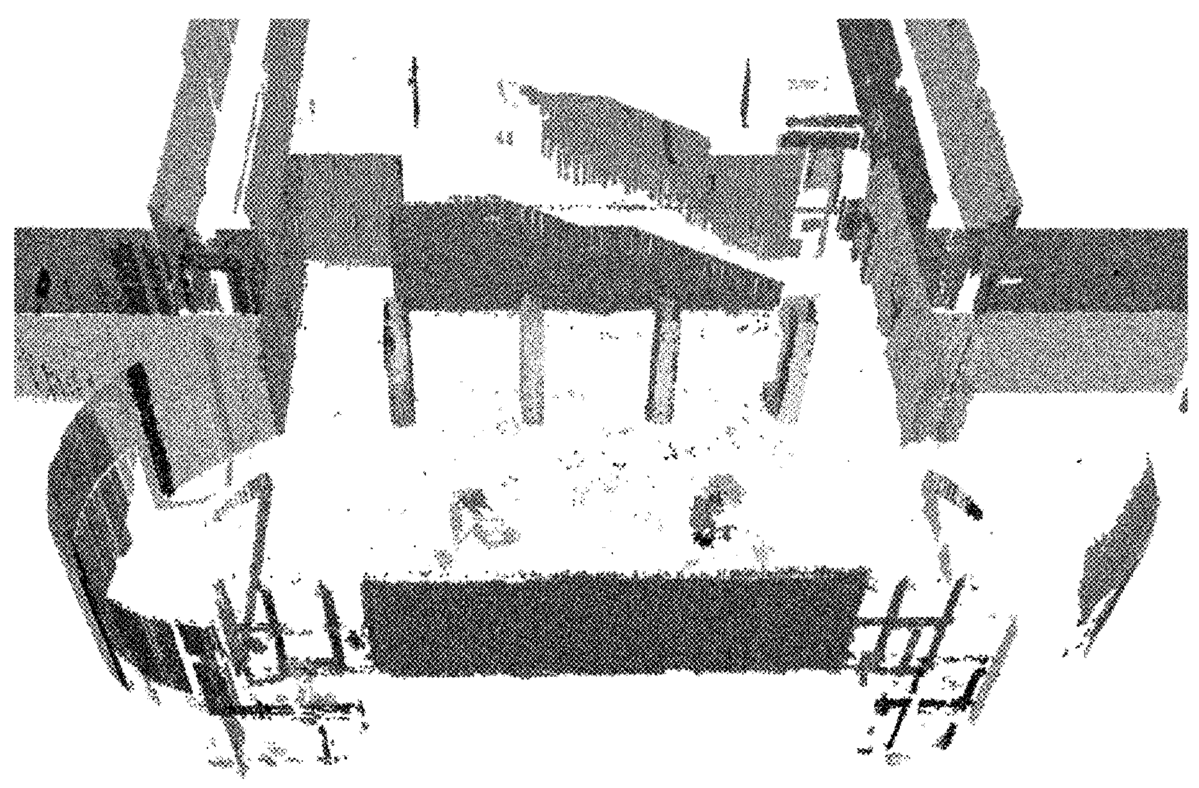
FIG. 2 illustrates how the point cloud acquired during mapping is segmented into planes that provide the models for projective transformations.

In an initial step, a point cloud is acquired, for example by laser-scanning of the environment. The point cloud is segmented into planes. These planes provide the model for projective transformations (FIG. 2).

In particular, planes in the point cloud model are identified by fitting horizontal planes (floors and ceilings) and vertical planes (walls) using a sample consensus method. Thereafter, a mapping M of 3D points to plane identifiers is performed. Subsequently, for each point P in the segmented cloud, the set of reference images $I_P$ that depict the given point are determined by, for each reference view, checking whether the point P lies inside the viewing frustum of the reference view, i.e., whether it is contained in the volume that's depicted by the camera. Casting rays from the point towards the respective reference view's camera centre is used to detect occlusions.

View Generation

Identification of Visible Planes

Figure 3:
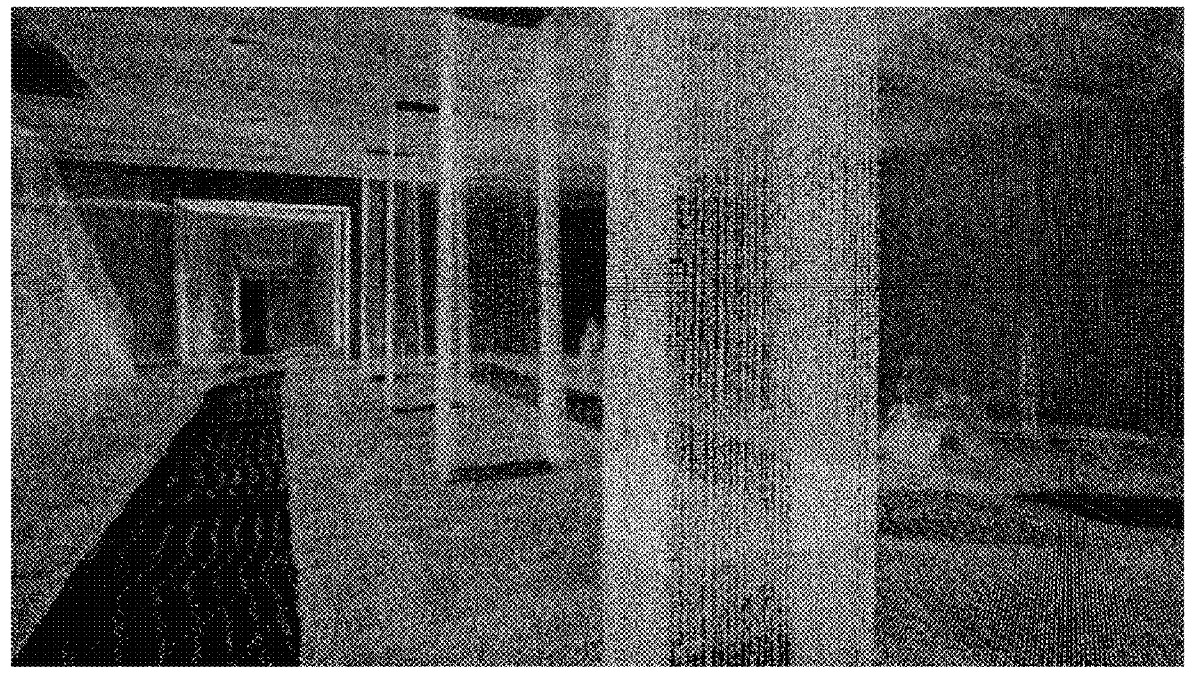
FIG. 3 (*a*) illustrates how the point cloud from a virtual viewpoint is used to lookup visible planes in a pre-computed point-to-plane map.
Figure 3:
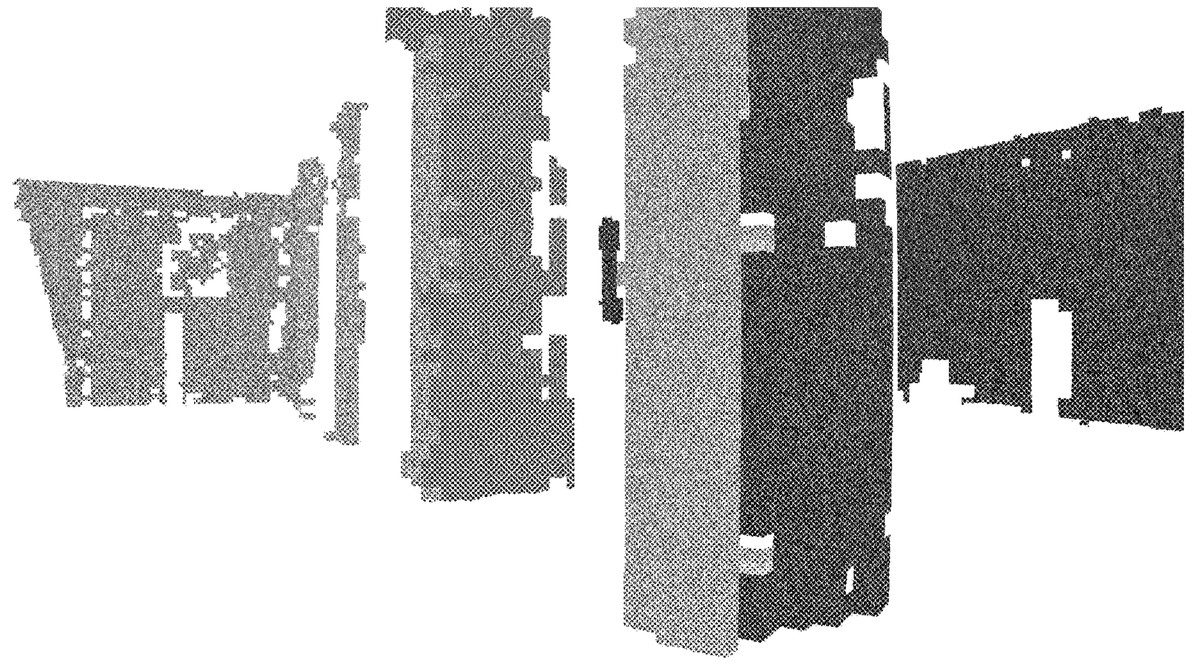
Figure 3:
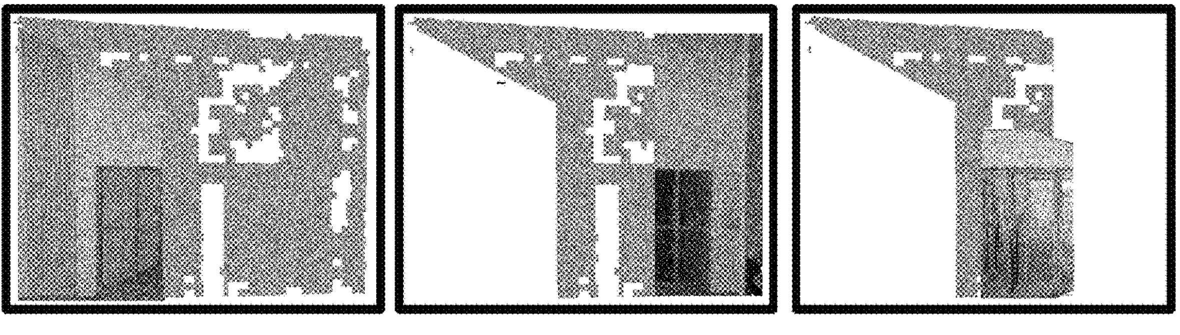

In an embodiment of the invention, first, the major planes visible in the virtual view (see FIG. 3*a*) are determined by casting rays from the centre of the virtual camera through pixels in its image plane into the scene. When a ray hits a scene point, the map M is used to lookup the plane's position in space (the plane parameters). This step is performed for all pixels of the virtual view (although spatial sub-sampling in the pixel domain can be used for efficiency), and the resulting list of planes is sorted by the number of pixels that belong to each plane. For each plane, the algorithm keeps track of the pixels that are part of the plane (see FIG. 3*b*).

Image Assignment

At this point, each plane is processed separately in order to find the reference images with a good view on the 3D points associated with that plane. In one embodiment, the algorithm combines the image lists $I_P$ for all plane points into a single list and applies histogram binning to determine the reference image which covers the plane best. In the following step, this image is warped to the virtual viewpoint and its pixels are removed from the current plane's pixel mask (see FIG. 3*c*). The image assignment process is repeated until the number of pixels remaining falls below a threshold or no more reference images are available for the plane.

The correct selection of reference images enhances the results. In an embodiment, two constraints are added to the image selection algorithm. First, an upper limit on the angle between the reference image's normal and the plane normal avoids using low-resolution views of a plane. Second, when multiple reference images cover approximately the same number of plane pixels, the one closest to the virtual view's location. This avoids low resolution warping results and prefers reference images with similar perspective.

Image Warping and Feature Extraction

The camera pose of the reference image is denoted by a homogenous 4×4 matrix $T_{ref}$, the pose of the virtual image is denoted by $T_{virt}$. The relative transformation between both views follows as $$T = T_{ref}^{-1} \cdot T_{virt} = \begin{bmatrix} R & t \\ 0^T & 1 \end{bmatrix}. \quad (1)$$

With a plane defined in Hessian normal form $x^T \cdot n = d$. the distance between the plane and the reference image is $$\Delta = t^T_{ref} n - d \quad (2)$$

The homography H relating coordinates in the reference image to coordinates in the virtual image is then given by $$H = K_{virt}\left(R - t \cdot \left(T_{ref}^{-1} \cdot n\right)^T \cdot \frac{1}{\Delta}\right)K_{ref}^{-1}, \quad (3)$$

where $K_{ref}$ and $K_{virt}$ are the camera calibration matrices for the reference image and the virtual image, respectively.

Figure 4:
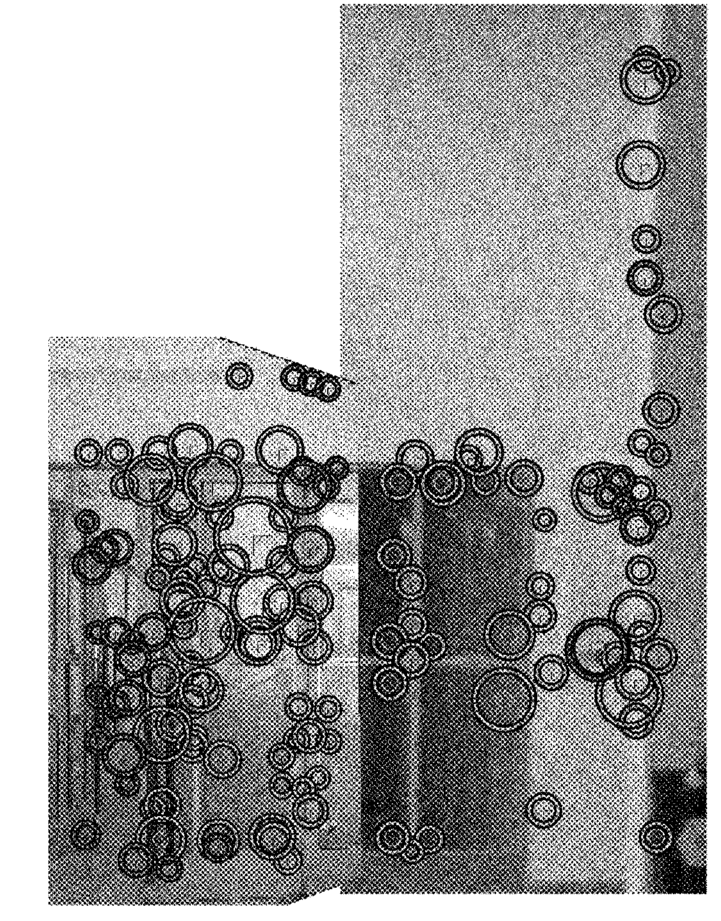
FIG. 4 illustrates warped image patches for the plane in FIG. 3 (*c*).

Using equation 3, the reference image is warped to the virtual viewpoint and local image features are extracted from the resulting image patch (see FIG. 4). For any non-trivial scene, the generated patch contains areas where the plane-to-plane homography is inadequate to express viewpoint change. For this reason, all features outside the pixel mask (see above) are discarded.

Finally, the features extracted from all the planes in a virtual view are combined into a single bag-of-features vector that is indexed by a CBIR system for retrieval during localization.

Localization

With the reference database prepared as described above, finding the position as well as the orientation of a camera is achieved by extracting features from the query image and retrieving the most similar virtual views from the CBIR database. This step can be performed very quickly using an inverted index and has been shown to scale well up to millions of documents.

Illustrative Implementation of an Embodiment

Figure 1:
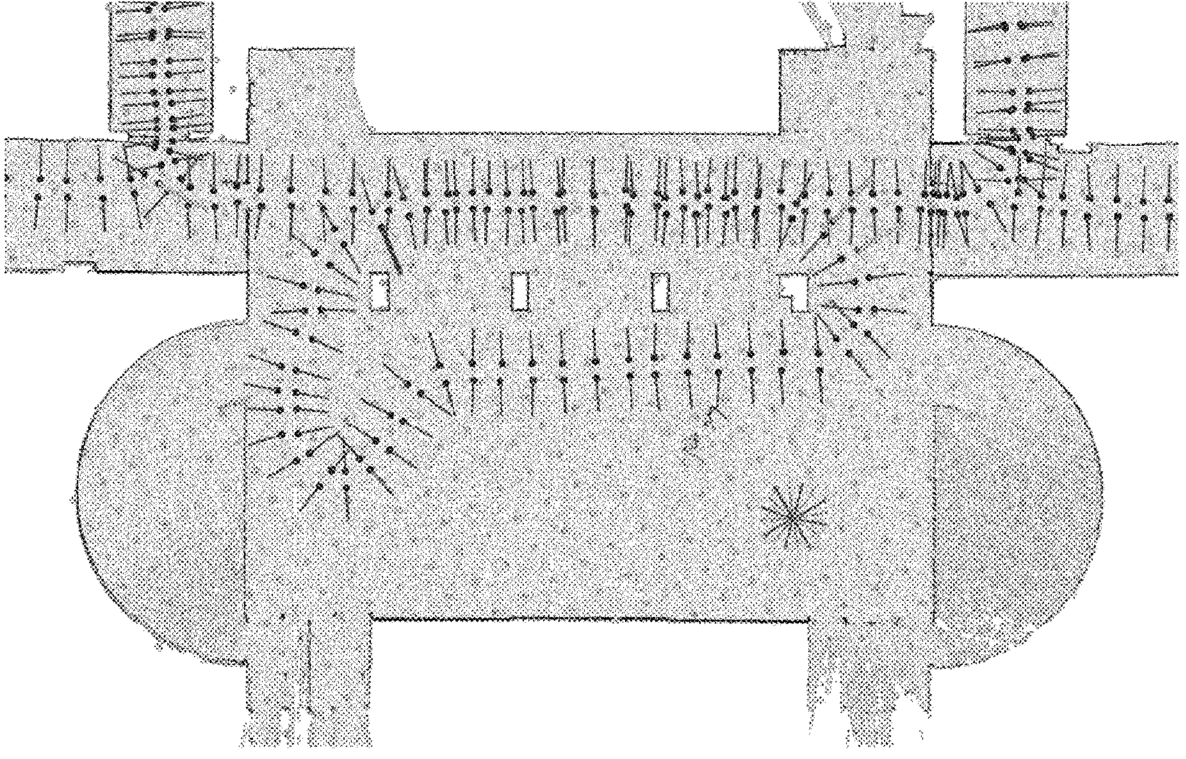
FIG. 1 illustrates images captured during mapping and the virtual viewpoints created. At each location, 16 views are computed.

In an illustrative, non-limiting implementation and evaluation of the invention, a dataset containing more than 40,000 images of the corridors and halls of a public building is used. For the evaluation a subset of 3,146 high-resolution close-ups is used, captured along a trajectory of more than one kilometer. The area shown in FIG. 1 is a small portion of this subset.

A simple scheme is used to determine locations where virtual views are created. The floorplan is sub-sampled to a resolution of one meter per pixel, and a virtual location is created for each "free" pixel. The height of the virtual camera is fixed a 1.50 m above ground. To simulate different orientations, virtual views are generated for yaw angles advancing in steps of π/8, creating 16 views per location. In total 6,352 locations and 101.632 views are obtained.

The system is scalable to a considerable higher number of views (e.g. up to 10 million views or more), as is common for conventional visual localisation systems. However, the present invention can provide the same accuracy as conventional systems on the basis of a relatively lower number of views.

The image retrieval system is trained on 24.8 million SIFT features extracted from the image patches for the virtual views (see FIG. 4). An approximate k-means (AKM) quantizer with a vocabulary size of 200,000 visual words and TF-IDF weighting is used. The query time per image on a single thread is around 200 ms, however AKM can easily be configured to perform considerably faster.

Figure 5:
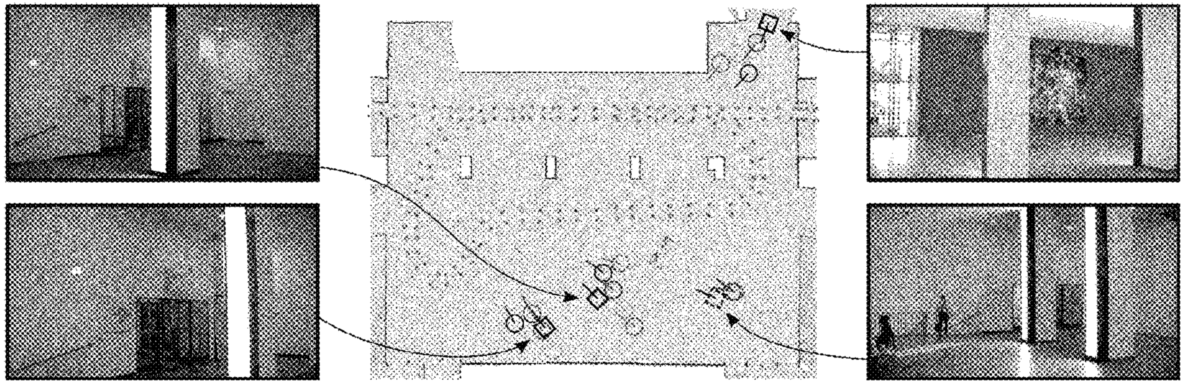
FIG. 5 illustrates top-ranked query results for four query images, wherein the black square is the ground truth pose. The location and orientation are drawn as circles. No post processing of image retrieval results has been applied.

The system is queried using images captured at various locations in the mapped environment. To demonstrate that the system is capable of inferring the appearance at arbitrary locations, attention is paid to keeping a distance to the mapper trajectory. Four query images and the corresponding results are shown in FIG. 5. The proposed method is able to robustly determine the correct orientation (quantized to intervals of π/8). The top-ranked image retrieval results concentrate in the immediate vicinity of the query location in almost all cases, only the rank-2 location result for the lower-right query image is a bit off. Nevertheless, the orientation is determined correctly in all cases.

The virtual camera uses the same calibration matrix as the query camera to ensure that the virtual views match what the query camera would see. If the field of view (FOV) between the cameras differs too much, a localization error along the camera's z-axis can occur. For the application of smartphone localization, it can be assumed that the FOVs do not vary considerably between different phone models. Further, the focal length of query cameras may be artificially lengthened simply by cropping the region of interest for feature extraction.

Table 1 shows the mean precision over 252 queries (six frames at 42 locations) achieved by the first result, by the top-3 results, and by the top-5 results, respectively. A precision of 1.0 is achieved if all top-ranked results are relevant. Clearly, the virtual view approach outperforms the conventional approach of using unprocessed reference images. In 56% of all cases, the top-ranked result is a correct location with our virtual view approach, compared to 33% when only reference images are used.

TABLE 1

Mean precision at cutoff ranks 1, 3 and 5.

| | P @ 1 | P @ 3 | P @ 5 |
|---|---|---|---|
| Reference Views (r = 5 m) | 0.33 | 0.28 | 0.25 |
| Virtual Views (r = 3 m) | 0.46 | 0.43 | 0.41 |
| Virtual Views (r = 3 m) | 0.57 | 0.57 | 0.56 |

Implementation of an Alternative Embodiment

An alternative embodiment is directed to more complex indoor environments that may include fewer (large) planes. For example, indoor environments can contain small and medium sized objects with complex geometry, e.g. exhibits in a museum. This embodiment employs an approach for virtual view generation in respect of environments with arbitrary geometry. The geometry is represented using depth maps. Using image-based rendering methods, the reference images are warped into their appearance at the virtual view location.

A method according to this embodiment can comprise the following steps:

1. Pre-processing of the point cloud.

1.1 Estimate the normal vector of each point; the point and the normal can be used to define a small, planar surface around the point; resulting in an approximation of the surface.

1.2a Construct a planar surface element using the point ("base point"), its normal, and a predetermined size or a size computed from the point density around the base point. The size is chosen as small as possible so that errors due to the planar approximation stay small, yet large enough to avoid any gaps between adjacent surface elements.

1.2b Instead of computing potentially disjoint surface elements as in 1.2a), surface reconstruction methods can be used to construct a polygon mesh.

2. For each reference image, create a depth map (depth image, range image) from the point cloud.

2.1 Render the surface elements or the triangle mesh from the reference image's viewpoint. (using OpenGL or similar techniques).

2.2 Read out the Z-buffer created during rendering; this buffer contains the depth of each pixel of the reference image. Instead of the depth (distance of point to camera plane), the whole process can also be performed using the distance (distance of point to camera centre).

3. For each virtual view, create a depth map, using the same steps as in 2.

4. Use image-based rendering to warp a reference image to a virtual view position.

4.1 The 3D locations displayed by the pixels of the virtual image are computed using the depth image generated previously and the camera extrinsics (position and orientation) and intrinsics (focal length, etc.).

4.2 Reference images are selected in a similar way as before, i.e. images close to the virtual viewpoint and with a similar viewing direction are preferred over others. This achieves minimizing distortions due to imperfect geometry and unmodelled effects like transparency. In order to also minimize the number of reference images required to generate a view, the reference views are selected based on the number of virtual view pixels they can contribute to the virtual view ("coverage"). Note that pixels that have been covered by a previous reference image (see 4.7) are not included in the coverage. Finally, the reference image with the highest coverage is selected. If there are multiple reference images with similar coverage (e.g. coverage/coverage best>0.9), the image closest to the virtual viewpoint is selected.

4.3 Projecting a 3D point into the reference image establishes a pixel-correspondence between the virtual view and the reference image.

4.4 Comparing the depth of the 3D point from the reference camera ("predicted depth") to the depth stored in the reference camera's depth image is used for detecting occlusions and innovations (e.g., when predicted depth is larger than depth in reference depth image, the reference image's view is obstructed by an obstacle).

4.5 For non-occluded and no-innovation pixels, the correspondences are used to fill in the pixels of the virtual view from their corresponding locations in the reference image. The virtual view pixels covered by the reference image are recorded for determining the coverage in the next iteration (4.2).

4.6 The resulting image patch is used for feature extraction.

4.7 Steps 4.2-4.6 are repeated until a predetermined fraction of the virtual view pixels have been computed or no more' reference images are available. Note that the next reference image is chosen based on the virtual view pixels that have not been covered by any-reference image yet (see 4.2). Nevertheless, the image patches are created using all pixels that can be contributed by the reference image, i.e., the individual image patches for a virtual view may have overlapping areas. This behavior is beneficial because it allows meaningful image features at the boundary of an image patch and increases the robustness with respect to inaccurate 3D geometry and other modelling errors.

4.8 The features extracted from all patches for a virtual view are combined into a feature set that represents the virtual view.

In an embodiment, the depth of a 3D point from a reference camera representing a predicted depth is compared with the depth stored in the reference camera's depth image. This comparison is used to detect occlusions or obstructions. For example, when the predicted depth is larger than the depth in the reference depth image, this indicates that the reference image's view is obstructed by an obstacle.

It will be appreciated that the above described embodiments are described as examples only, and that modifications to these embodiments are included within the scope of the appended claims.

What is claimed is:

1. A method of visual localization, the method comprising:

obtaining one or more real reference images of an environment, wherein each of the reference images is associated with a viewpoint;

transforming, using image based rendering, the reference images into novel views or image patches representing viewpoints of arbitrary camera positions and orientations in the environment separate from the viewpoints associated with the reference images;

training an image retrieval system on features extracted from the novel views or image patches;

obtaining at least one query image;

extracting features from the at least one query image; and, determining the location where the query image was obtained using said trained image retrieval system and said features extracted from the at least one query image.

2. The method of claim 1, wherein the at least one query image is obtained by a mobile device.

3. The method of claim 1, wherein each of the reference images is transformed into the respective novel views or image patches by simulating a change, relative to a plane of the respective reference image, in the viewpoint associated with the respective reference image to one of the viewpoints of the arbitrary camera positions and orientations.

4. The method of claim 3, wherein the simulating the change is conducted as a function of the poses and calibrations of the viewpoints and the plane's position in space.

* * * * *